(12) United States Patent
Kim

(10) Patent No.: US 6,407,978 B1
(45) Date of Patent: Jun. 18, 2002

(54) APPARATUS OF REPRODUCING RECORDED SIGNAL ON OPTICAL RECORDING MEDIUM AND METHOD THEREOF

(75) Inventor: Dae Young Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/219,355

(22) Filed: Dec. 23, 1998

(30) Foreign Application Priority Data

Dec. 24, 1997 (KR) .......................................... 97-741989

(51) Int. Cl.[7] ................................................. G11B 7/00
(52) U.S. Cl. .................................. 369/124.13; 369/44.36
(58) Field of Search .......................... 369/48, 50, 124.1, 369/124.13, 124.11, 53.34, 47.26, 47.28, 44.35

(56) References Cited

U.S. PATENT DOCUMENTS 5,339,302 A * 8/1994 Takahashi et al. ............ 369/54
5,418,764 A * 5/1995 Roth et al. ................. 369/48 X
5,848,048 A * 12/1998 Tachibana .................... 369/124

* cited by examiner

*Primary Examiner*—Aristotelis M. Psitos
(74) *Attorney, Agent, or Firm*—Birch, Stewart, Kolasch & Birch, LLP

(57) ABSTRACT

A recorded signal reproducing method for an optical recording medium that is adapted to accurately reproduce a signal recorded on the optical recording medium having wobbled tracks. In the method, a signal included in the optical recording medium is picked up and a specified period of signal included the picked-up signal is detected. The picked-up signal is compensated in accordance with the specified period signal.

12 Claims, 9 Drawing Sheets

APPARATUS OF REPRODUCING RECORDED SIGNAL ON OPTICAL RECORDING MEDIUM AND METHOD THEREOF

BACKGROUND OF THE INVENTION

1. Field of the Invention

This invention relates to apparatus and method for reproducing a signal recorded on an optical recording medium.

2. Description of the Related Art

Nowadays, an optical recording medium prevails in recording media for recording an information such as video and audio information. A write-once disc, such as CD-ROM, DVD-ROM, etc., and a write-once read-many type of disc, such as CD-R, DVD-R are available for the optical recording medium in the market. Recently, there has been suggested a rewritable disc such as CD-RW(compact disc-rewritable), DVD-RW(digital versatile disc-rewritable), etc.

As shown in FIG. 1, the DVD-RAM is divided into a data area DA for recording a user data and a header area HA pre-formatted with an identification information. The data area DA and the header area HA exist alternately in the circumferential direction of the DVD-RAM. As shown in FIG. 1B, the data area DA is provided with a groove track 10 having a concave section and a land track 12 having a convex section. These groove and land tracks 10 and 12 exist alternately in the radial direction. A recording pit train 14 is defined along a center-line of the disc at each of the groove and land tracks 10 and 12 to record a user data. A boundary side 18 of the groove and land tracks 10 and 12 is wobbled in a shape of sinusoidal-wave signal. A wobbling signal occupying a low frequency band is detected by changing a light quantity reflected by the wobbled boundary side 18 periodically. This wobbling signal is used to generate a channel clock and so on in recording mode.

The optical disc reproducing apparatus includes a recorded signal reconstruction apparatus as shown in FIG. 2 to detect a data recorded in a shape of the recording pit train 14 and the pre-pit train 16 into the corresponding pulse train. The recorded signal detector consists of an equalizer 20 and a comparator 22 connected in series, and an integrator 24 connected to a feedback loop of the comparator 22. The equalizer 20 receives a radio frequency signal RF detected by an optical pickup (not shown). As shown in FIG. 3, the radio frequency signal RF has a different amplitude depending on a length (e.g., 3T to 14T) of the recording pit and the pre-pit. Such a radio frequency signal RF is equalized by means of the equalizer 20 in such a manner to has a constant amplitude like an equalized radio frequency signal ERF in FIG. 3. The equalizer 20 controls an amplification factor in accordance with the amplitude of the radio frequency signal RF, thereby applying the equalized radio frequency signal having a constant amplitude to the comparator 22. The comparator 22 converts the equalized radio frequency signal ERF into a pulse signal PS shown in FIG. 3. To this end, the comparator 22 compares the equalized radio frequency signal ERF with a slice voltage Vsl and logicalizes the compared result. The pulse signal generated at the comparator 22 has a width corresponding to a length (e.g., 3T to 11T) of the recording pit 14 or the pre-pit 16. The integrator 24 integrates the pulse signal PS from the comparator 22 to detect an average level voltage of the pulse signal PS, that is, a direct current voltage level. Also, the integrator 24 applies the average level voltage to the comparator 22 as the slice level voltage Vsl. The slice level voltage Vsl varies in accordance with a length of the recording pit 14 and a distance ratio between the recording pits 14. Accordingly, the pulse signal outputted from the comparator 22 always has a duty ratio of 50%, and allows a user data to be reproduced accurately.

For example, a user data recorded on the disc is encoded in such a manner that a total length of the recording pits 14 included in a constant length of unit recording region (i.e., frame) corresponds to 50% the length of the unit recording region. Accordingly, when a normally recorded user data is reproduced, an average voltage level of the pulse signal PS detected by the integrator 24 has "0 V". As a result, the normal pulse signal PS identical to that upon reproduction is detected from the comparator 22 without a variation in the slice level voltage Vsl. Otherwise, the recording pits occupy a region more than or less than 50% of the unit recording region at the time of recording a data due to a recording light quantity, a rotation speed or a surrounding temperature, etc. A high logic pulse width of the pulse signal PS when a user data recorded in the unit recording region is reproduced becomes narrower and wider than a high logic pulse width of the pulse signal PS when a normally recorded data is reproduced. This results from a light quantity reflected by the unit recording region abnormally being larger or smaller than a light quantity reflected by the unit recording region normally. When a unit recording region having the abnormally recorded data is reproduced, an average level voltage detected by the integrator 24 becomes higher or lower than "0 V". As the average level voltage becomes high or low, a high logic pulse width of the pulse signal PS outputted from the comparator 22 becomes narrow or wide. As a result, a pulse signal PS having always a constant range of width(i.e., 3T to 11T) is reconstructed at the comparator 22. As described above, the slice level voltage is controlled in accordance with a duty ratio of the pulse signal PS, thereby stabbly performing the reconstruction of the pulse signal PS using the comparator 22.

As shown in FIG. 4, a high frequency component of pit train signal PTS from the recording pit train 14 and/or the pre-pit train 16 as well as a low frequency component of wobbling signal WS from the boundary side between the wobbled groove and land tracks 10 and 12 is included in a high frequency signal WRF picked up from the disc such as the above-mentioned DVD-RAM, that is, a high frequency signal picked up from the wobbled track(hereinafter referred to as "wobbling radio frequency signal"). Due to this, a direct current voltage level of the wobbling radio frequency signal PRF fails to have a constant voltage level (e.g., "0 V") and changes in the low frequency component of wobbling signal as shown in FIG. 4. This is caused by a fact that a high frequency component of pit train signal PTS is combined with a low frequency component of wobbling signal WS to swing in accordance with an envelop of the wobbling signal WS. On the other hand, because a high frequency signal NRF, hereinafter referred to as "normal radio frequency signal", picked up from a disc without the wobbled groove and land tracks, hereinafter referred to as "normal disc", does not include the low frequency component of wobbling signal WS, it has a constant direct current voltage level(e.g., "0 V"). When both the wobbling radio frequency signal WRF and the normal radio frequency signal NRF is converted into a shape of pulse signal by means of the recording signal reconstructing apparatus in FIG. 2, a pulse signal WPS, hereinafter referred to as "wobbling pulse signal", derived from the wobbling radio frequency signal WRF has a length different from the length(i.e., 3T to 11T) of the recording pit 14 periodically, whereas a pulse signal NPS, hereinafter referred to as "normal pulse signal", derived from the normal radio frequency signal NRF has a width corresponding to the length of the recording pit 14. In other words, a large or small width of error is periodically generated in the wobbling pulse signal WPS. This is caused by a fact that the large-width error and the small-width error in the wobbling pulse signal WPS is canceled every a period of the wobbling signal WS to maintain a direct current voltage level detected at the integrator 22 constantly. Such a pulse reconstruction error will be more apparent from the following description with reference to FIG. 2. Referring to FIG. 5, the wobbling radio frequency signal WRF is sliced on a basis of a slice level voltage Vsl to produce a wobbling pulse signal WPS. If the normal radio frequency signal NRF is sliced on a basis of a slice level voltage Vsl, then a normal pulse signal NPS is produced. Edges of the wobbling pulse signal WPS becomes gradually distant from edges of the normal pulse signal NPS and thereafter draws gradually near to them in accordance with a change in the amplitude of the wobbling signal. More specifically, the edges of the wobbling pulse signal WPS is most far away from the edges of the normal pulse signal NPS at the peak of the wobbling signal WS. For example, at the positive peak of the wobbling signal WS, the wobbling pulse signal WPS rises at a time "t1" going by a time interval Δ2 from a time "t1" when the normal pulse signal NPS rises. Further, a deviation Δ2 between the edge of the wobbling pulse signal WPS at the peak of the wobbling signal WS and the edge of the normal pulse signal NPS becomes larger than deviations Δ1and Δ3between the edge of the wobbling pulse signal WPS at the rising portion and the falling portion of the wobbling signal WS and the edge of the normal pulse signal NPS. Moreover, a width of the wobbling pulse signal WPS becomes narrower than that of the normal pulse signal NPS at the positive region of the wobbling signal WS, whereas a width of the wobbling pulse signal WPS becomes wider than that of the normal pulse signal NPS at the negative region of the wobbling signal WS .

As described above, the conventional recording signal detector detects a pulse signal having a width different from the length of the recording pits on the wobbled track. Such a width error in the pulse signal acts as a noise component at the later signal processing stage such as the conversion of channel bit stream, thereby preventing a user data on the wobbled track from being reproduced accurately.

SUMMARY OF THE INVENTION

Accordingly, it is an object of the present invention to provide an apparatus and method for reproducing a recorded signal on an optical recording medium that is adapted to accurately reproduce a signal recorded on the optical recording medium having wobbled tracks.

Further object of the present invention is to provide an apparatus and method for reproducing a recorded signal on an optical recording medium that is adapted to accurately reproduce a signal recorded on the optical recording medium.

In order to achieve these and other objects of the invention, a recorded signal reproducing method for an optical recording medium according to one aspect of the present invention includes the steps of picking up a signal included in a signal included in the optical recording medium; detecting a specified period of signal included in the picked-up signal; and compensating for the picked-up signal on a basis of the specified period of signal.

A recorded signal reproducing method for an optical recording medium according to another aspect of the present invention includes the steps of picking up a signal included in a signal included in the optical recording medium; detecting a specified period of signal included in the picked-up signal; and reconstructing a data signal from the picked-up signal on a basis of the specified period of signal.

A recorded signal reproducing apparatus for an optical recording medium according to still another aspect of the present invention includes a pickup for picking up a signal included in a signal included in the optical recording medium; detecting means for detecting a specified period of signal included in the signal from the pickup; and compensating means for Compensating for the signal from the pickup on a basis of the specified period of signal from the detecting means.

A recorded signal reproducing apparatus for an optical recording medium according to still another aspect of the present invention includes a pickup for picking up a signal included in a signal included in the optical recording medium; detecting means for detecting a specified period of signal included in the signal from the pickup; and reconstruction means for reconstructing a data signal from the signal picked up by the pickup on a basis of the specified period of signal from the detecting means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 2:
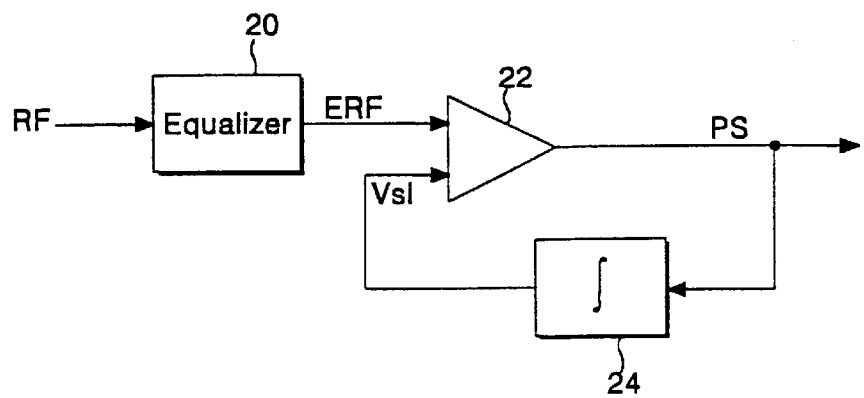
FIG. 2 is a schematic block diagram showing the configuration of the conventional recorded signal reconstruction apparatus.
Figure 4:
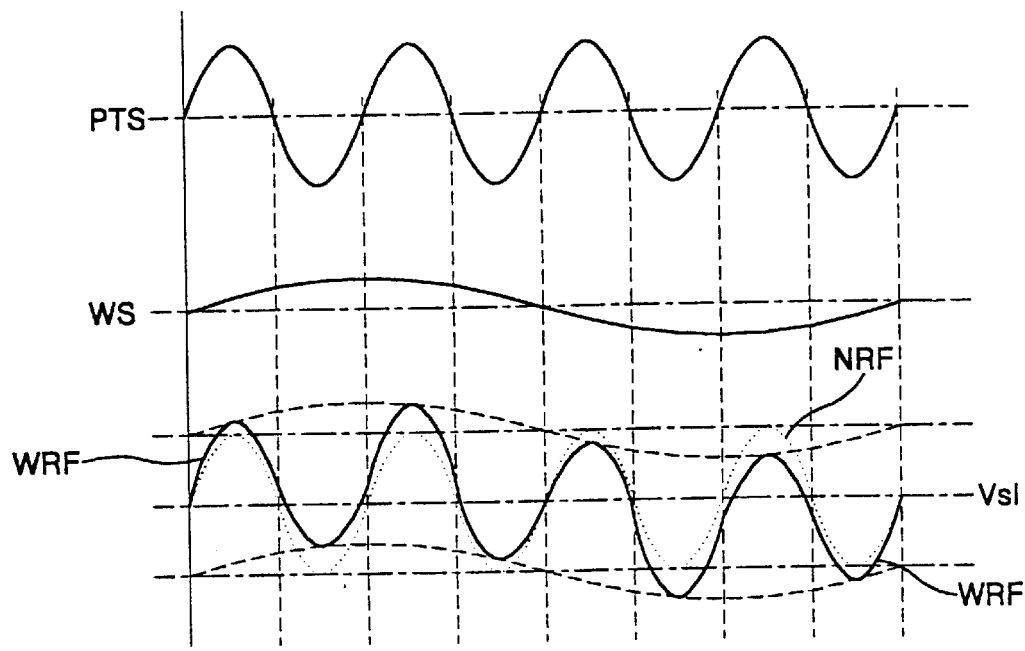
FIG. 4 is waveform diagrams of signals picked up from the DVD-RAM in FIG. 1A.
Figure 6:
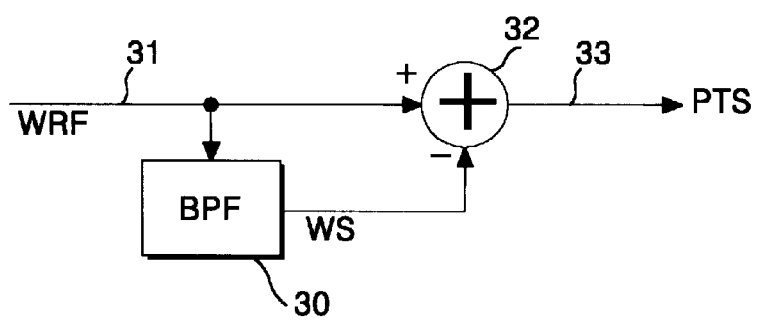
FIG. 6 is a schematic block diagram showing the configuration of a recorded signal reproducing apparatus according to an embodiment of the present invention.

Referring to FIG. 6, there is shown a recorded signal reproducing apparatus according to an embodiment of the present invention. The reproducing apparatus includes a band pass filter (BPF) 30 and a subtrator 32 for commonly receiving a wobbling radio frequency signal WRF from an input line 31. The wobbling radio frequency signal WRF is generated at an optical pickup, not shown, for accessing an optical recording medium. The wobbling radio frequency signal WRF includes a pit train signal PTS and a wobbling signal WS as shown in FIG. 4. In other words, the wobbling radio frequency signal WRF has a pit train signal swinging periodically in accordance with the wobbling signal WS. The wobbling signal WS is produced by the boundary side of the wobbled track, but it may turn into a noise component generated periodically when the pickup picks up a signal on the non-wobbled track. The BPF 30 makes a band pass filtering of the wobbling radio frequency signal WRF from the input line 31 to detect only the wobbling signal WS from the wobbling radio frequency signal WRF. The wobbling signal WS detected by the BPF 30 is applied to the subtractor 32 in a state of having a gain of "1". The subtractor 32 subtracts the wobbling signal WS from the BPF 30 from the wobbling radio frequency signal WRF from the input line 31, thereby detecting a pit train signal PTS in which an average level voltage is constantly maintained, that is, in which the positive swing width is equal to the negative swing width. The subtraction operation of the subtractor 32 is performed in a state of phase-inverting the wobbling signal SW to be combined with the wobbling radio frequency signal WRF. The pit train signal PTS detected at the subtractor 32 is applied to the equalizer 10 in FIG. 2 as a radio frequency signal RF.

Figure 7:
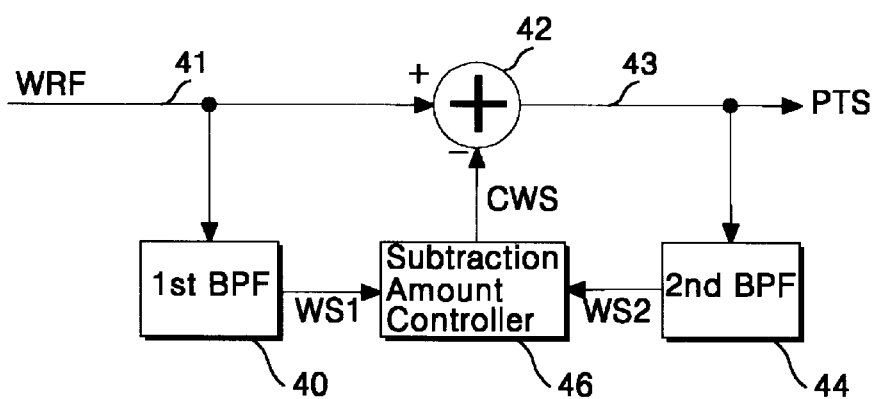
FIG. 7 is a schematic block diagram showing the configuration of a recorded signal reproducing apparatus according to another embodiment of the present invention.

Referring now to FIG. 7, there is shown a recorded signal reproducing apparatus according to another embodiment of the present invention that includes a first BPF 40 and a subtractor 42 for commonly receiving a wobbling radio frequency signal from an input line 41. The first BPF 40 makes a band pass filtering of the wobbling radio frequency signal WRF to detect a wobbling signal WS1 included in the wobbling radio frequency signal WRF, hereinafter referred to as "first wobbling signal". The subtractor 42 subtracts a controlled wobbling signal CWS from the wobbling radio frequency signal WRF from the input line 41 to detect a pit train signal from the wobbling radio frequency signal WRF. The pit train signal PTS detected at the subtractor 42 is applied, via an output line 43, to the equalizer 20 in FIG. 2 as a radio frequency signal RF.

The recorded signal reproducing apparatus further includes a second BPF 44 for commonly receiving a pit train signal PTS from the output line 43, and a subtraction amount controller 46 connected among the subtractor 42, the first and second BPFs 40 and 44. The second BPF 44 makes a band pass filtering of the pit train signal PTS from the output line 43 to detect a wobbling signal WS2 that may be included in the pit train signal PTS, hereinafter referred to as "second wobbling signal". The second wobbling signal WS2 detected at the second BPF 44 includes a low frequency signal having a phase equal to or contrary to the first wobbling signal WS1, a low frequency signal having a smaller amplitude than the first wobbling signal W31, or a direct current voltage having a constant level. The second wobbling signal WS2 is applied to the subtraction amount controller 46. The subtraction amount controller 46 controls a magnitude (i.e., amplitude) of the first wobbling signal WS1 in accordance with the second wobbling signal WS2, and applies the amplitude controlled first wobbling signal (hereinafter referred to as "controlled wobbling signal CWS") to the subtractor 42. More specifically, the subtraction amount controller 46 amplifies the first wobbling signal WS1 in proportion to the magnitude of the second wobbling signal WS2 when the second wobbling signal SW2 has the same phase as the first wobbling signal WS1, thereby applying a controlled wobbling signal CWS enlarged by the magnitude of the second wobbling signal WS2 to the subtrator 42. In this case, a value larger than the magnitude of the second wobbling signal WS2 is subtracted from the wobbling radio frequency signal WRF at the subtractor 42. On the other hand, the subtraction amount controller 46 attenuates the first wobbling signal WS1 in proportion to the magnitude of the second wobbling signal SW2 when the second wobbling signal has a phase contrary to the first wobbling signal SW1, thereby applying a controlled wobbling signal CWS decreased by the magnitude of the second wobbling signal WS2. In this case, a value smaller than the magnitude of the second wobbling signal WS2 is subtracted from the wobbling radio frequency signal WRF at the subtractor 42. Otherwise, the subtraction amount controller 46 applies the first wobbling signal WS1 to the subtractor 42 as the controlled wobbling signal CWS when the second wobbling signal WS2 includes only a constant level of direct current voltage, thereby maintaining a subtraction amount of the wobbling radio frequency signal WRF constantly. In other words, the subtraction amount controller 46 controls an amplitude of the first wobbling signal WS1 in accordance with whether or not a wobbling signal is included in the pit train signal PTS on the output line 43 and in accordance with a phase of the wobbling signal included in the pit train signal PTS on the output line 43, thereby adaptively controlling a subtraction amount for the wobbling radio frequency signal WRF at the subtractor 42.

Figure 8:
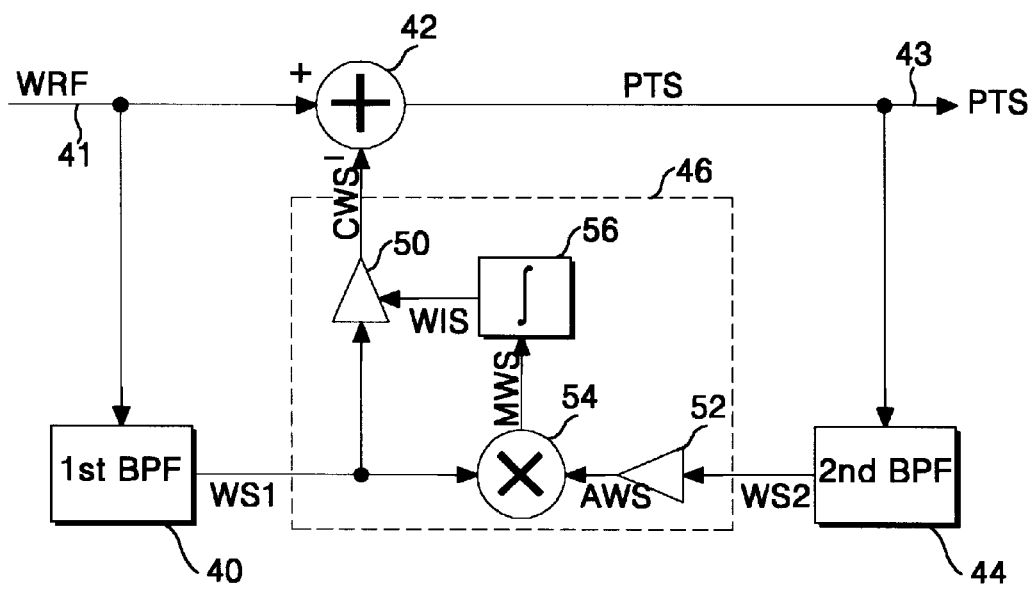
FIG. 8 is a detailed block diagram of the recorded signal reconstructing apparatus of FIG. 7.

FIG. 8 shows a recorded signal reproducing apparatus of FIG. 7 in which an embodiment of the subtraction amount controller 46 is shown in detail. In FIG. 8, the subtraction amount controller 46 consists of a variable amplifier 50 connected between the first BPF 40 and the subtractor 42; and a fixed amplifier 52, a multiplier 54 and an integrator 56 that are connected, in series, to the second BPF 44. The fixed amplifier 52 amplifies the second wobbling signal WS2 from the second BPF 44 at a constant amplification factor and applies the amplified second wobbling signal (hereinafter referred to as "amplified wobbling signal AWS") to the multiplier 54. The multiplier 54 multiplies the first wobbling signal WS1 from the first BPF 40 by the amplified wobbling signal AWS, and applies the multiplied signal (hereinafter referred to as "multiplied wobbling signal MWS") to the integrator 56. The integrator 56 integrates the multiplied wobbling signal MWS to detect an average level voltage of the multiplied wobbling signal MWS (hereinafter referred to as "wobble integrated signal WIS"). The wobble integrated signal WIS generated at the integrator 56 is applied to the variable amplifier 50, thereby allowing the variable amplifier 50 to perform the amplification or attenuation operation and thereby determining an amplification factor or an attenuation factor. The variable amplifier 50 amplifies or attenuates the first wobbling signal WS1 from the first BPF 40 in accordance with whether the wobble integrated signal WIS from the integrator 56 has a positive voltage or a negative voltage. Also, the variable amplifier 50 amplifies or attenuates the first wobbling signal WSI at a ratio changing in accordance with a level of the wobble integrated signal WIS to produce the controlled wobbling signal CWS.

Figure 9A:
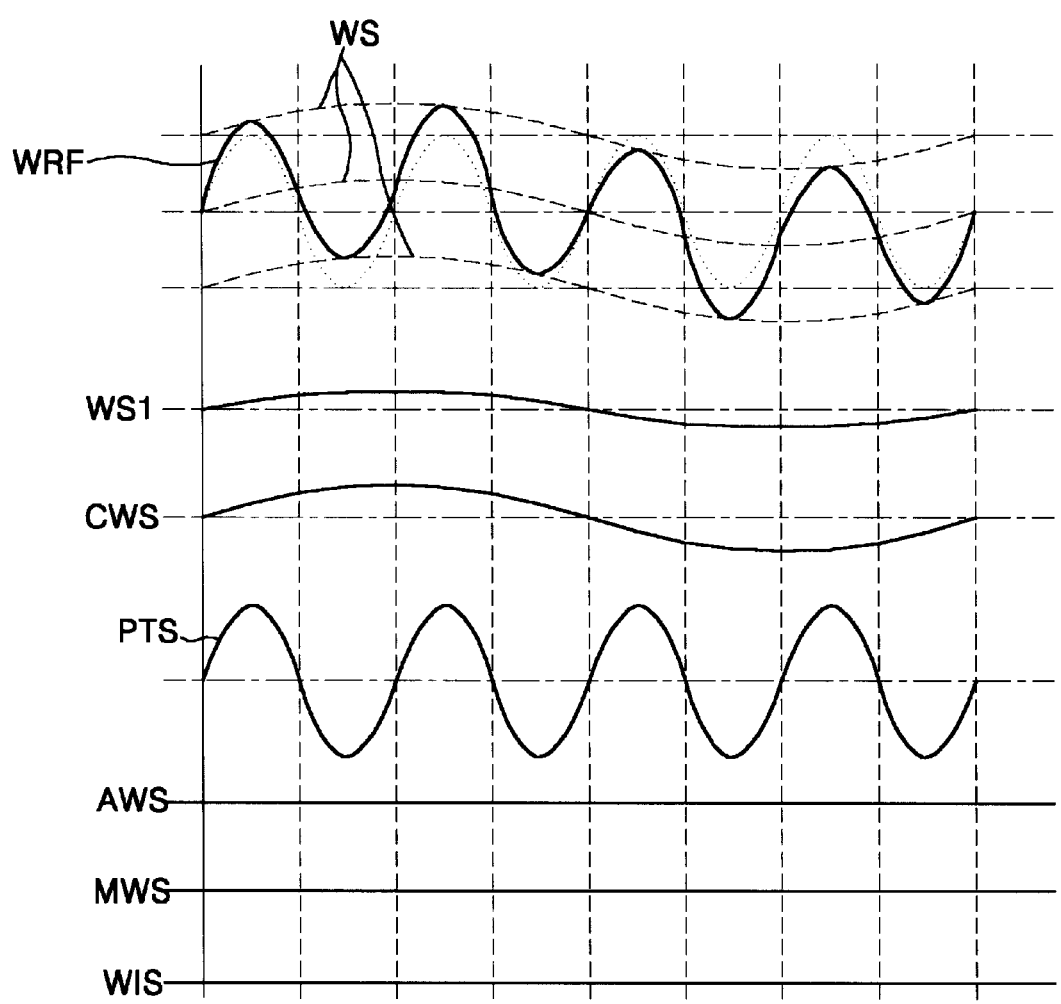
FIG. 9A to FIG. 9C are waveform diagrams for explaining an operation of the reproducing apparatus of FIG. 8 in accordance with a state of eliminating a wobbling signal.

FIG. 9A shows waveform diagrams of signals outputted from each part of the reproducing apparatus of FIG. 8 when an amplitude of the controlled wobbling signal CWS outputted from the variable amplifier 50 is equal to that of the wobbling signal WS included in the wobbling radio frequency signal WRF. Referring now to FIG. 9A, because the wobbling signal WS included in the wobbling radio frequency signal WRF is completely eliminated by means of the subtractor 42, a wobbling component does not exist in the pit train signal PTS. Accordingly, both the second wobbling signal WS2 detected at the second BPF 44 and the amplified wobbling signal AWS outputted from the fixed amplifier 52 have "0 V". The multiplied wobbling signal MWS outputted from the multiplier 54 and the wobble integrated signal WIS outputted from the integrator 56 also have "0 V". The variable amplifier 50 responding to the wobble integrated signal WIS of "0 V" amplifies the first wobbling signal WS1 by a base amplification factor α determined upon design, thereby applying the controlled wobbling signal CWS, in which an amplitude of the first wobbling signal WS1 is controlled, to the subtractor 42. The subtractor 42 subtracts the controlled wobbling signal CWS from the amplitude of the wobbling radio frequency WRF to detect only the pit train signal PTS. At this time, as the wobbling signal WS included in the wobbling radio frequency signal WRF increases, the controlled wobbling signal CWS outputted from the variable amplifier 50 also increases by the increased amount of the wobbling signal WS. On the other hand, as the wobbling signal WS included in the wobbling radio frequency signal WRF decreases, the controlled wobbling signal CWS outputted from the variable amplifier 50 also decreases by the decreased amount of the wobbling signal WS. Accordingly, the wobbling signal WS included in the wobbling radio frequency signal WRF is completely eliminated by means of the subtractor 42. As a result, the pit train signal PTS only is detected from the subtractor 42.

Figure 9B:
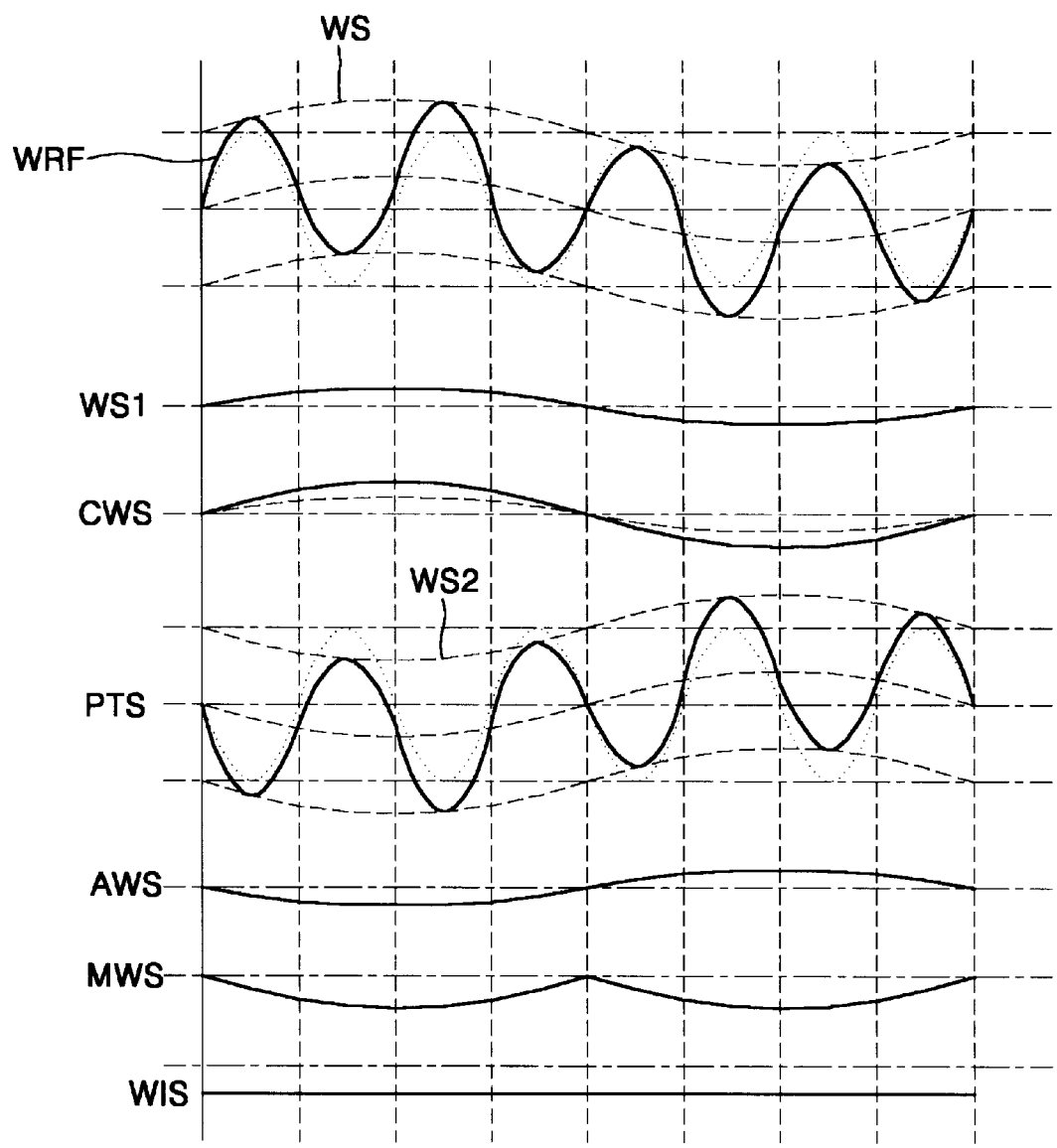

FIG. 9B is waveform diagrams of signals outputted from each part of the recorded signal reproducing apparatus of FIG. 8 when a controlled wobbling signal CWS having a larger amplitude than the wobbling signal WS included in the wobbling radio frequency signal WRF is applied to the subtractor 42. In other words, FIG. 9B explains the operation of the recorded signal reproducing apparatus when a value larger than the amplitude of the wobbling signal WS is subtracted from the wobbling radio frequency signal WRF by means of the subtractor 42. In this case, because the amplitude of the controlled wobbling signal CWS is larger than that of the wobbling signal WS included in the wobbling radio frequency signal WRF, the pit train signal PTS outputted from the subtractor 42 includes the second wobbling signal WS2 having a phase contrary to the wobbling signal WS. The fixed amplifier 52 outputs the amplified wobbling signal AWS having a phase equal to the second wobbling signal WS2 and an amplitude larger than the second wobbling signal WS2, and the multiplier 54 generates a multiplied wobbling signal MWS having a full-wave rectified envelop in the negative direction. The integrator 56 generates a wobbling integrated signal WIS having a negative level of direct current voltage. The variable amplifier responding to the negative level of direct current voltage attenuates the amplitude of the first wobbling signal WS1 to decrease the amplitude of the controlled wobbling signal CWS. Accordingly, since the amplitude of the wobbling signal WS included in the wobbling radio frequency signal WRF becomes equal to that of the controlled wobbling signal CWS, the amplitude of the wobbling signal WS is subtracted from the wobbling radio frequency signal WRF by means of the subtractor 42. As a result, only a pit train signal PTS without the wobbling signal is detected from the subtractor 42.

Figure 9C:
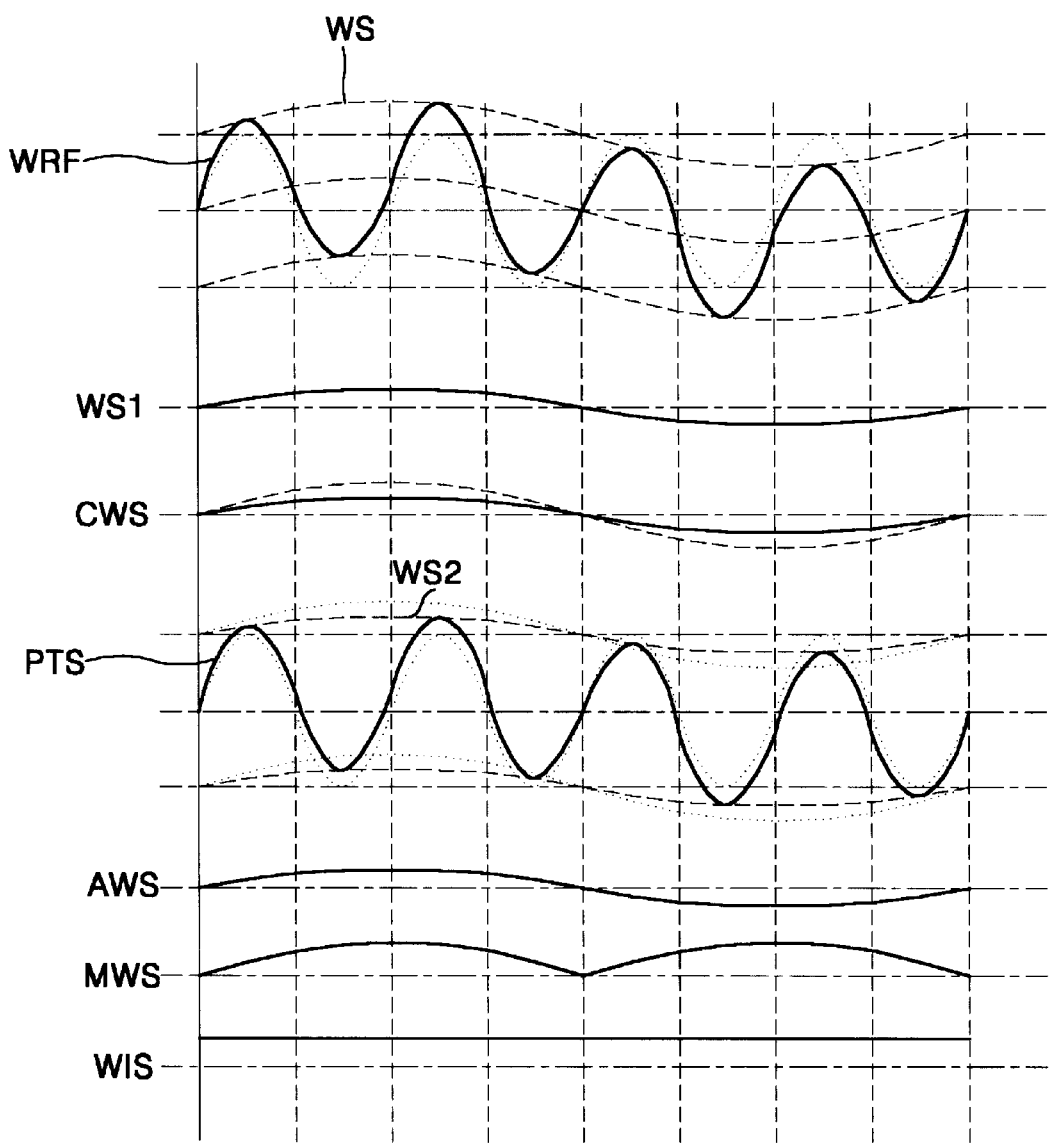

FIG. 9C is waveform diagrams of signals outputted from each part of the recorded signal reproducing apparatus of FIG. 8 when a controlled wobbling signal CWS having a smaller amplitude than the wobbling signal WS included in the wobbling radio frequency signal WRF is applied to the subtractor 42. In other words, FIG. 9C explains the operation of the recorded signal reproducing apparatus when a value smaller than the amplitude of the wobbling signal WS is subtracted from the wobbling radio frequency signal WRF by means of the subtractor 42. In this case, because the amplitude of the controlled wobbling signal CWS is smaller than that of the wobbling signal WS included in the wobbling radio frequency signal WRF, the pit train signal PTS outputted from the subtractor 42 includes the second wobbling signal WS2 having a phase identical to the wobbling signal WS. The fixed amplifier 52 outputs the amplified wobbling signal AWS having a phase identical to the second wobbling signal WS2 and an amplitude larger than the second wobbling signal WS2, and the multiplier 54 generates a multiplied wobbling signal MWS having a full-wave rectified envelop in the positive direction. The integrator 56 responds to the positive full-wave rectified signal to generate a wobbling integrated signal WIS having a positive level of direct current voltage. The variable amplifier responding to the positive level of direct current voltage amplifies the first wobbling signal WS1 to increase the amplitude of the controlled wobbling signal CWS. Accordingly, since the amplitude of the wobbling signal WS included in the wobbling radio frequency signal WRF becomes equal to that of the controlled wobbling signal CWS, the amplitude of the wobbling signal WS is subtracted from the wobbling radio frequency signal WRF by means of the subtractor 42. As a result, only a pit train signal PTS without the wobbling signal is detected from the subtractor 42.

In FIG. 9B and FIG. 9C, the controlled wobbling signal CWS determining a subtraction amount of the wobbling radio frequency signal WRF adaptively keeps up with the magnitude of a low frequency component of wobbling signal included in the wobbling radio frequency signal WRF, so that the wobbling signal generated by the wobbling of track is completely eliminated. Furthermore, an unnecessary low frequency noise introduced from the exterior upon reproduction or a certain order of harmonic components of the low frequency noise and their combined components can be eliminated. Since the wobbling signal and the low frequency noise from the exterior is completely eliminated, a pit train signal for the recording pit train is accurately reconstructed into a pulse signal having the same width as the recorded signal by means of the recorded signal reconstruction apparatus of FIG. 2.

Figure 3:
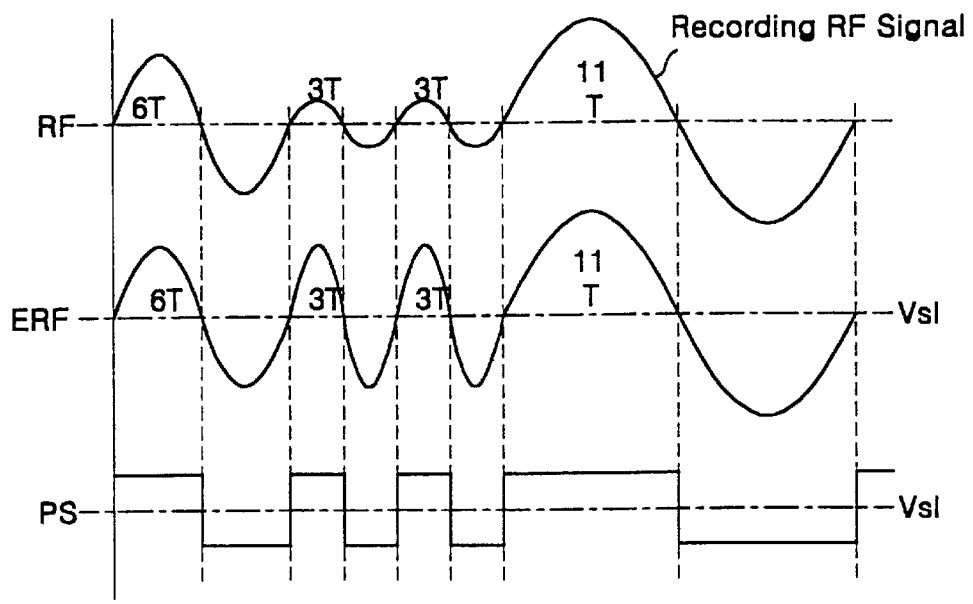
FIG. 3 is waveform diagrams of signals outputted from each part of the reconstructing apparatus in FIG. 2.
Figure 10:
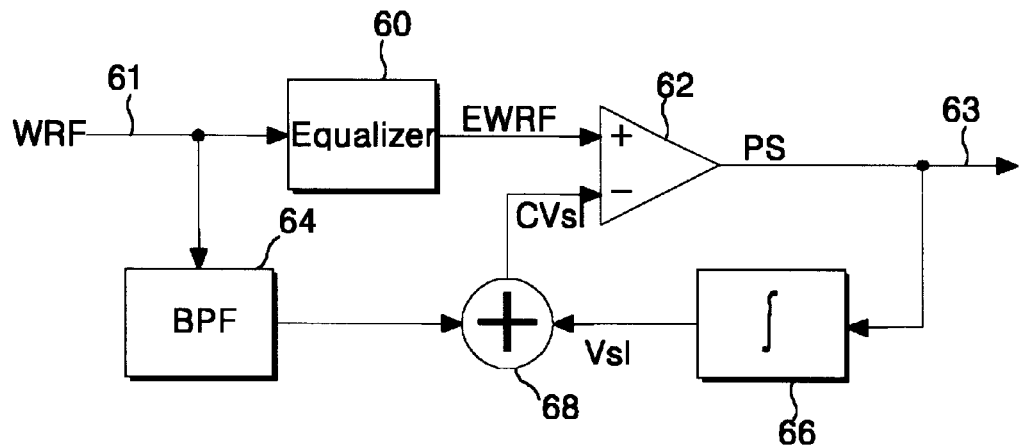
FIG. 10 is a schematic block diagram of a recorded signal reconstruction apparatus according to an embodiment of the present invention.
Figure 11:
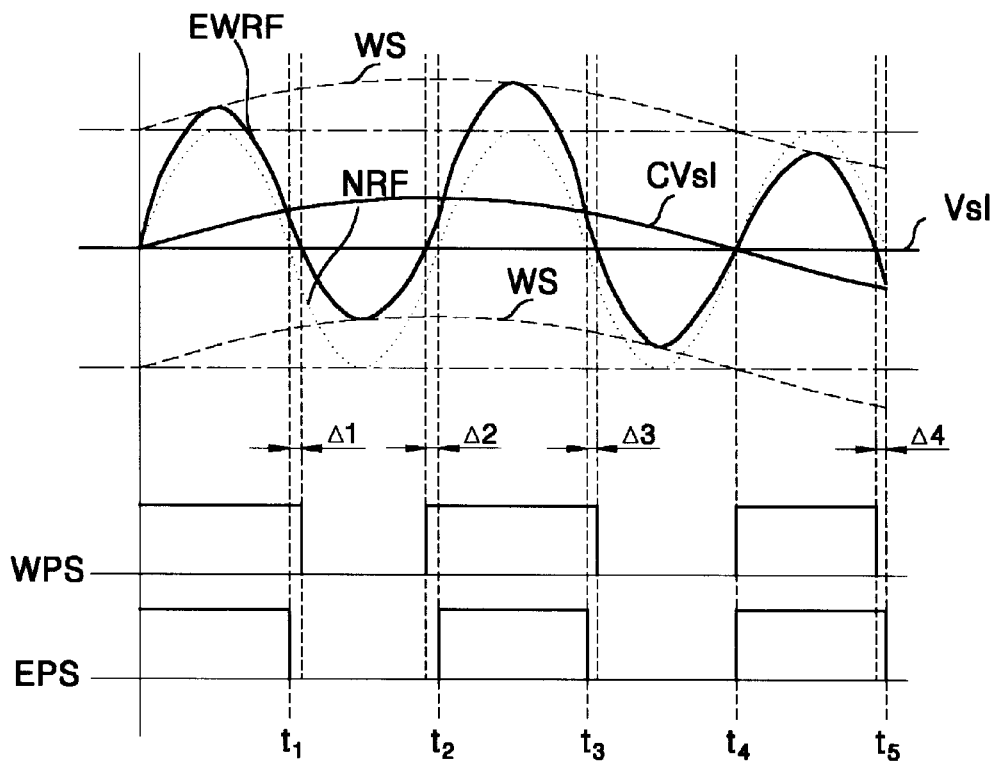
FIG. 11 is output waveform diagrams of each part for explaining the compared characteristic between the recorded signal reconstruction apparatus of FIG. 10 and the conventional recorded signal reconstruction apparatus.

Referring now to FIG. 10, there is shown a recorded signal reconstruction apparatus according to an embodiment of the present invention. The recorded signal reconstruction apparatus reconstructs a pulse signal with no error from the wobbling radio frequency signal WRF in a state in which a wobbling signal included in the wobbling radio frequency signal WRF is not eliminated. To this end, the reconstruction apparatus includes an equalizer 60 and a comparator 62 connected, in series, between an input line 61 and an output line 63. The wobbling radio frequency signal WRF has such a waveform that allows the radio frequency signal RF shown in FIG. 3 to be swung in accordance with the wobbling signal WS shown in FIG. 4. The equalizer 60 equalizes the wobbling radio frequency signal WRF to generate a signal EWRF having a constant amplitude and swinging in accordance the wobbling signal as shown in FIG. 11 (hereinafter referred to as "second wobbling radio frequency signal"). The second wobbling radio frequency signal EWRF is sliced with a compensating slicing level voltage CVsl using the comparator 62 to emerge a pulse signal PS at the output line 63.

Figure 1A:
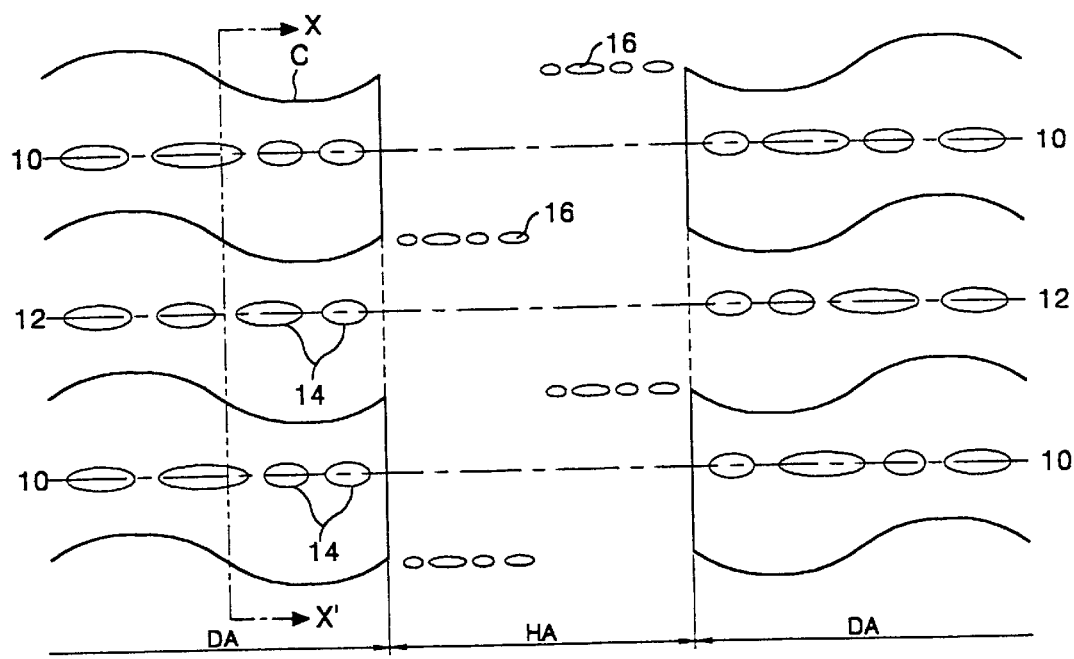
FIG. 1A is a schematic view showing a part of a DVD-RAM.
Figure 1B:
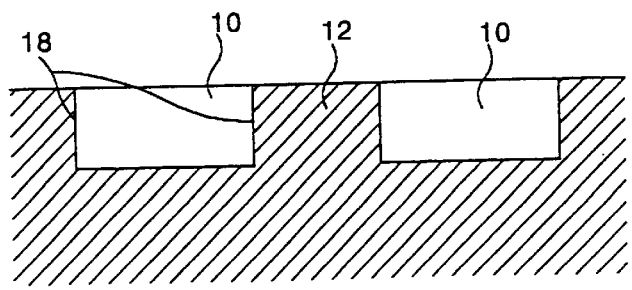
FIG. 1B is a sectional view of the tracks taken along the line X–X' in FIG. 1.

The recorded signal reconstruction apparatus further includes a BPF 64 for receiving the wobbling radio frequency signal WRF from the input line 61, and an integrator 66 for receiving the pulse signal PS from the output line 63. The BPF 64 makes a band pass filtering of the wobbling radio frequency signal WRF from the input line 61 to detect the wobbling signal WS included in the wobbling radio frequency signal WRF. The wobbling signal WS detected at the BPF 64 is applied to an adder 68. The integrator 66 integrates the pulse signal PS on the output line 63 to detect an average level voltage of the pulse signal PS. The average level voltage is applied to the adder 68 as a slicing level voltage Vsl. The adder 68 adds the slicing level voltage Vsl from the integrator 66 to the wobbling signal SW form the BPF 64 to generate the compensating slicing level voltage CVsl. As shown in FIG. 11, the compensating slicing level voltage CVsl generated at the adder 68 has the same waveform as the wobbling signal WS and a voltage heighten by the average level voltage of the pulse signal PS. The second wobbling radio frequency signal EWRF is sliced on a basis of the compensating slicing level voltage CVsl, so that the pulse signal PS reconstructed from the second wobbling radio frequency signal EWRF becomes identical to the pulse signal upon recording and has an accurate width corresponding to the length (i.e., 3T to 11T) of the recording pits in FIG. 1. In other words, the pulse signal PS reconstructed from the second wobbling radio frequency signal EWRF does not include any errors.

Figure 5:
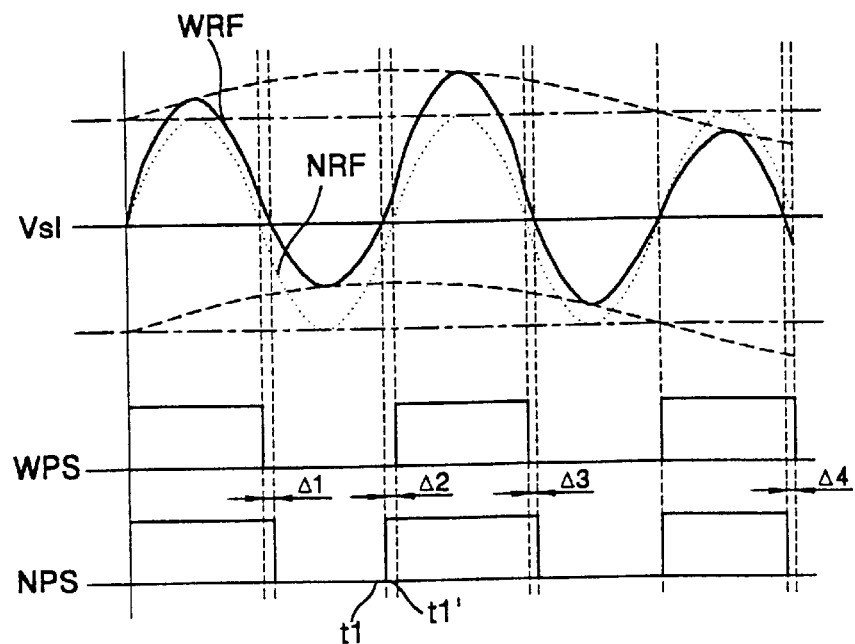
FIG. 5 is waveform diagrams for comparing a wobbling radio frequency signal mixed with a wobbling signal with pulse signals reconstructed from a normal radio frequency signal without a wobbling signal.

FIG. 11 is waveform diagrams for comparing the response characteristic of a recorded signal reconstruction apparatus according to an embodiment of the present invention with that of the conventional recorded signal reconstruction apparatus. In FIG. 11, "EPS" represents an improved pulse signal generated by slicing the second wobbling radio frequency signal EWRF with the compensating slicing level voltage according to an embodiment of the present invention. "WPS" represents a wobbling pulse signal generated by slicing the second wobbling radio frequency signal EWRF with the normal slicing level voltage Vsl used in the prior art. "NRF" represents the normal radio frequency signal, which does not include wobbling signal, as shown in FIG. 5. Edges of the improved pulse signal EPS are accurately consistent with the times (i.e., t1, t2, t3, t4 and t5) at which the normal radio frequency signal NRF crosses with the normal slicing level voltage Vsl. Most edge of the wobbling pulse signal WPS is not consistent with the times (i.e., t1, t2, t3, t4 and t5) at which the normal radio frequency signal NRF crosses with the normal slicing level voltage Vsl. Also, it is to be noted that error widths (i.e., Δ1, Δ2, Δ3 and Δ4) from the edge of the wobbling pulse signal WPS into a crossing point between the normal radio frequency signal NPS and the normal slicing level voltage Vsl is eliminated from the improved pulse signal EPS. As a result, the improved pulse signal EPS has the same waveform as the normal pulse signal NPS shown in FIG. 5. As described above, in the recorded signal reproducing apparatus according to the embodiment of the present invention, the wobbling radio frequency signal WPS is sliced with the compensating slice level voltage to which the wobbling signal is added, thereby reconstructing a pulse signal having a width consistent accurately with the length (i.e., 3T to 11T) of the recording pit in the track. This pulse signal prevents an error in the conversion into data in a process of the following bit stream conversion utilizing a so-called "eight-to-fourteen demodulation". As a result, the recorded signal reconstruction apparatus permits a user data recorded on the wobbled track to be accurately reproduced.

As described above, in the recorded signal reproducing apparatus for an optical recording medium according to the present invention, the wobbling signal indicating a data transfer rate is eliminated from a signal picked up from the wobbled track of the optical recording medium, thereby detecting a data signal(i.e., a signal caused by the recording pit train) accurately. Accordingly, a user data recorded on the wobbled track of the optical recording medium can be accurately reproduced. Also, in the recorded signal reproducing apparatus for an optical recording medium according to the present invention, the unnecessary low frequency noise introduced thereto due to a mechanical vibration and the like is eliminated from a signal picked up from the wobbled track of the optical recording medium, thereby detecting a data signal(i.e., a signal caused by the recording pit train) accurately. Accordingly, a user data recorded on the wobbled track of the optical recording medium can be accurately reproduced. Furthermore, in the recorded signal reproducing apparatus for an optical recording medium according to the present invention, a signal picked up from the wobbled track of the optical recording medium is sliced on a basis of the slicing level voltage compensated by the wobbling signal, so that a pulse signal for a data signal(i.e., a signal caused by the recording pit train) is accurately reconstructed. Accordingly, a user data recorded on the wobbled track of the optical recording medium can be accurately reproduced. Moreover, in the recorded signal reproducing apparatus for an optical recording medium according to the present invention, a signal picked up from the wobbled track of the optical recording medium is sliced on a basis of a slicing level voltage compensated by the unnecessary low frequency noise introduced thereto due to a mechanical vibration and the like, so that a data signal(i.e., a signal caused by the recording pit train) is accurately reconstructed. Accordingly, a user data recorded on the wobbled track of the optical recording medium can be accurately reproduced. As a result, according to the present invention, since the correction of error and the second pick-up of signal is unnecessary, it becomes possible to improve the responsibility as well as an access time of the optical recording medium Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of reproducing a recorded signal on an optical recording medium, comprising the steps of:
    (A) picking up a signal included in the optical recording medium;
    (B) detecting a specified periodic signal included in the picked-up signal;
    (C) controlling a gain of the specified periodic signal;
    (D) compensating the picked-up signal in accordance with the controlled signal in the step (C);
    (E) re-detecting the specified periodic signal from the compensated signal; and
    (F) controlling further a gain control amount of the specified periodic signal in accordance with the re-detected specified periodic signal.

2. The method as claimed in claim 1, wherein the specified periodic signal includes a wobbling signal derived from the wobbled track of the optical recording medium.

3. The method as claimed in claim 1, wherein the specified periodic signal is a noise component introduced in the step (A).

4. The method as claimed in claim 1, wherein the step (F) includes:

controlling a gain control amount of the specified periodic signal in such a manner that the magnitude of the re-detected specified periodic signal has a value of "0".

5. The method as claimed in claim 4, wherein the step F includes:

producing a signal depending on an amplitude and phase of the re-detected specified periodic signal; and applying the signal depending on an amplitude and phase of the re-detected specified periodic signal as a signal for indicating the gain control amount.

6. The method as claimed in claim 5, herein the producing step includes multiplying the re-detected specified periodic signal by the specified periodic signal detected in the step (B) and integrating the multiplied signal.

7. An apparatus for reproducing a recorded signal on an optical recording medium, comprising:

a pickup for picking up a signal contained in the optical recording medium;

detecting means for detecting a specified periodic signal from the picked-up signal;

combining means for combining a gain-controlled specified periodic signal from a gain control means with the picked-up signal from the pickup and thereby outputting a combined signal; and the gain control means for controlling a gain of the specified periodic signal from the detecting means based on the combined signal and thereby outputting the gain-controlled specified periodic signal.

8. The apparatus as claimed in claim 7, wherein the specified periodic signal includes a wobbling signal derived from a wobbled track of the optical recording medium.

9. The apparatus as claimed in claim 7, wherein the specified periodic signal is a component introduced when the pickup picks up a signal on the optical recording medium.

10. The apparatus as claimed in claim 7, wherein the gain control means includes:

variable amplifying means for variably amplifying the specified periodic signal from the detecting means, second detecting means for re-detecting a specified periodic signal from the combined signal output from combining means; and gain calculating means for producing a gain control signal to be applied to the variable amplifying means on a basis of an amplitude and phase of the specified periodic signal from the second detecting means.

11. The apparatus as claimed in claim 10, wherein the gain calculating means produces the gain control signal in such a manner that the magnitude of the specified periodic signal detected by the second detecting means has a value of "0".

12. An apparatus for reproducing a recorded signal on an optical recording medium, comprising:

a pickup for picking up a signal included in a signal included in the optical recording medium;

detecting means for detecting a signal portion corresponding to a specified period of the signal included in the signal from the pickup;

combining means for combining the signal portion corresponding to a specified period of the signal from the detecting means with the signal from the pickup; and gain control means for controlling a gain of the signal portion corresponding to the specified period of the signal transferred from the detecting means to the combining means, wherein the gain control means includes, variable amplifying means for variably amplifying the signal portion corresponding to the specified period of the signal transferred from the detecting means, second detecting means for detecting a signal portion corresponding to the specified period of the signal from an output signal of the combining mean, and gain calculating means for producing a gain control signal to be applied to the variable amplifying means on a basis of an amplitude and phase of the signal portion corresponding to the specified period of the signal from the second detecting means.

* * * * *